Jan. 17, 1928.  
O. P. SMITH  
1,656,298
BRAKING DEVICE FOR ELECTRIC CARS AND THE LIKE
Filed May 14, 1926
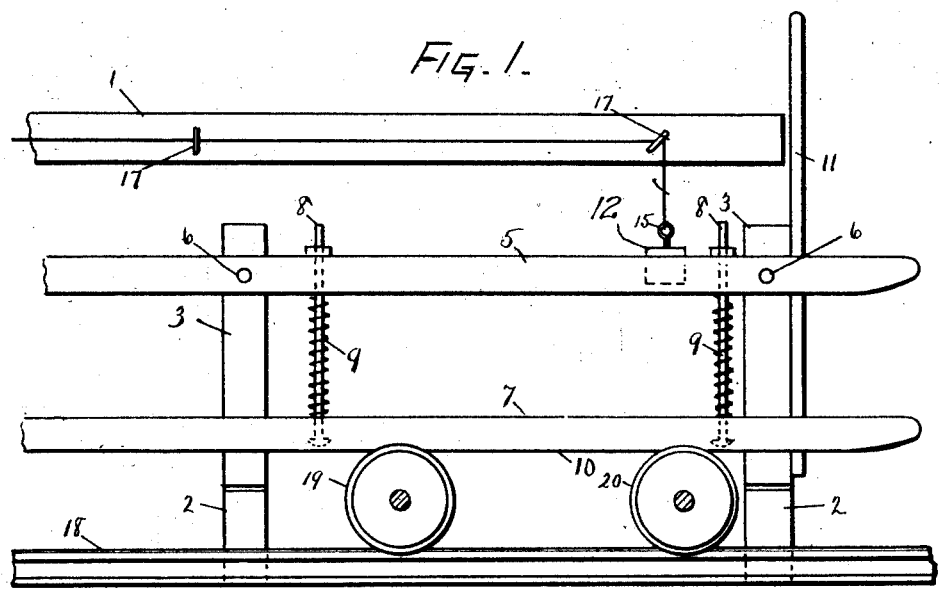
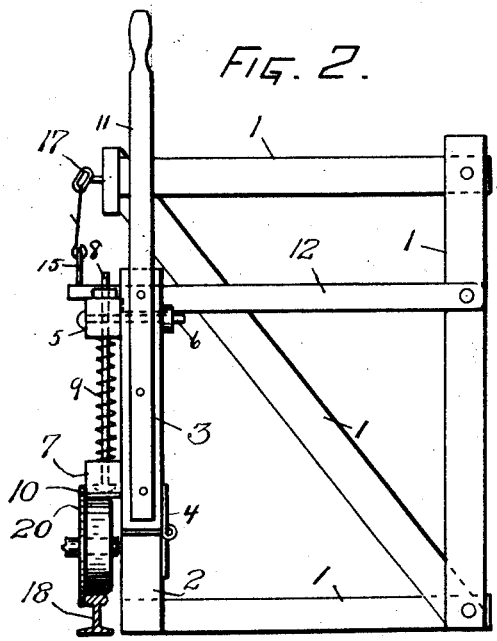
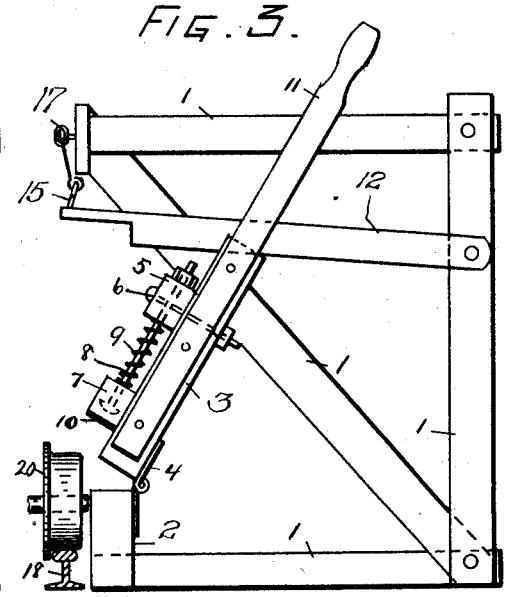
INVENTOR:  
Owen P. Smith  
By Chester W. Brown  
his Attorney Patented Jan. 17, 1928.

1,656,298

UNITED STATES PATENT OFFICE.

OWEN P. SMITH, OF MIAMI, FLORIDA; HANNAH M. SMITH ADMINISTRATRIX OF SAID OWEN P. SMITH, DECEASED.

BRAKING DEVICE FOR ELECTRIC CARS AND THE LIKE.

Application filed May 14, 1926. Serial No. 109,042.

My invention relates to means for stopping electric and other cars which are operated at high speed, where it is desirous to bring them to a stop within a reasonable distance to avoid damage by collision or other cause.

One of the objects of my invention is to provide means of stopping the cars for convenience in operation, and to prevent damage by collision, which shall be quickly acting, safe, and positive in its action.

Another object is to provide such a means, which shall be yieldable, and bring the said car to a gradual stop, without causing damage to the said car, the track, or the mechanism employed to stop said car.

With the above and other objects in view which will more particularly appear in the following specifications, I have shown in the accompanying illustrations, one embodiment of my said invention, as applied to electric cars employed on dog racing tracks, consisting of the parts and construction as shown in said illustrations, in which like numerals of reference indicate similar parts throughout the various views, and in which Fig. 1 is a side elevation of my said braking device, showing the wheels and rail in position when the braking means is applied. (The remaining parts of the car are not shown.)

Fig. 2 is an elevation taken from the right in Fig. 1, showing the same parts in braking operation.

Fig. 3 is an end view similar to Fig. 2, but with braking means out of engagement with the car wheels as shown.

The braking mechanism which I have illustrated in the accompanying drawings, is the form which I have employed to brake the electric cars on dog racing tracks. These tracks are small, usually not more than one-quarter of a mile in circumference and the electric car must be operated at a very high rate of speed to keep ahead of the dogs. When the race is ended, it is necessary to switch the car upon a siding, out of sight of the dogs, and bring it to a stop within a reasonable distance.

The form of brake which I have provided to accomplish this is composed of a wooden supporting frame, 1, 1, 1, 1, built adjacent the track as shown. While I have built this frame of 4" x 4" wood timbers, it is apparent that it may be built of much heavier timbers for heavier work, or may be made of metal, if preferred, and may be of any construction which will afford support to the parts hereinafter described. To the upper ends of the short up-right posts 2, 2, I have attached the timbers 3, 3, by means of the hinges 4, 4. To the upright timbers 3, 3 I have attached the horizontal timber 5, by means of suitable bolts as 6, 6. To this horizontal timber 5 I have loosely attached a second horizontal timber, as 7. To adapt the timber 7 to perform the operations hereinafter described, I have loosely mounted said timber 7 to the timber 5 by means of bolts, as 8, 8. The heads of these bolts are countersunk in the timber 7, as shown, and are passed through holes in the timber 5, which permit a loose fit, with nuts on the upper ends of the bolts, as shown. Superimposed between the said timbers 5 and 7 I have provided the compression springs 9, 9, which are placed about the respective bolts 8, 8, and are thus held in operating position against accidental displacement. The objects of the construction above described, are to hold the timber 7 in operating position, with a certain amount of yielding spring tension as force is applied from below. This tension may be increased or decreased by various sizes of springs, or by turning the nuts on the ends of the bolts 8, 8, or by placing washers at suitable positions against said springs, thus providing a ready and efficient means for varying the spring tension to suit the braking force required for the particular work to be done. On the under side of timber 7 and in position to contact with the car wheels, I have usually provided some form of brake lining material to receive the wear of the wheels as 10. For convenience in operation I have provided the handle 11, which may be operated by hand to set the said brake when desired. A locking member, as 12 is provided, which is pivotally mounted to the supporting frame at one end, and at the other end has a suitable notch, adapted to engage the top and inner side of the timber 5, and prevent it from movement in that direction when force is applied in operation. At 15 I have provided a screw eye for attachment of a rope or cord to raise the end of said brace 12 when it is desired to release it, and at 17, 17 I have provided additional screw eyes to form a guide-way to conduct the said rope back to any suitable place for the operator to manipulate the same.

In the drawings I have shown one rail of the track, as 18, with two car wheels, as 19 and 20 mounted upon said rail, with the upper sides of the car wheels in contact with the braking timber 7, as shown in Figs. 1 and 2.

When it is desired to set the brake to stop the car, the parts 5 and 7 are moved to the left from the position shown in Fig. 3, and the locking brace 12 is placed securely in position to prevent said member 5 from moving backward. In this position, shown in Fig. 2, the lower edge of the timber 7 should be in line for contact with upper sides of wheels 19 and 20, as shown in Fig. 2. When the car comes in on the siding, the lower side of the timber 7 contacts with the upper edges of the car wheels 19 and 20, with a spring tension, and the car is safely and surely brought to a stop, without damage to the car, the rails, or the braking mechanism.

While I have shown my braking mechanism as applied to the wheels on one side of the car, it will be apparent, that it may be equally well applied to both sides, when desired, and give double the braking efficiency.

The brake which I have shown is intended to be operated by hand but it is apparent that suitable springs may be attached to the timber 5 and to facilitate its release whenever it is desired to the position shown in Fig. 3. In addition, a spring attached to the locking brace 12 would tend to hold it more securely in position in its locking position shown in Fig. 2.

Having thus described my invention, what I claim and desire to secure by Letters Patent, is the following:—

1. In a device of the class described, a supporting frame disposed adjacent the track for wheeled cars, a braking member hingedly mounted on a horizontal shaft on the supporting frame for lateral swinging movement toward and away from a substantially vertical position at the side of the track and arranged to contact with the tops of the wheels on the side of the car passing on the adjacent rail of the track to arrest movement of the car, and means for locking the braking member in operative position.

2. In a device of the class described, a supporting frame disposed adjacent the track for wheeled cars, and a spring actuated braking member hingedly mounted on a horizontal pivot on the supporting frame for lateral swinging movement toward and away from a substantially vertical position at the side of the track and arranged for contact with the top of the wheels on the side of the car passing on the adjacent rail of the track to brake the car, means for locking the braking member in operative position, and means whereby to release the locking means to permit swing of the locking member to inoperative position.

3. In a braking mechanism for cars and the like, a front supporting frame located at one side of a track, a swinging frame hinged at the bottom to the supporting frame and movable to and from a vertical position, a spring actuated bar carried by the swinging frame and arranged to engage the wheels of a car at the tops of the said wheels, and a transversely disposed locking bar pivoted at the outer end to the supporting frame and having its inner end arranged to engage the hinged frame and lock the same against outward movement.

In testimony whereof, I have duly signed the foregoing specification.

OWEN P. SMITH.